United States Patent
Althaus et al.

(10) Patent No.: US 10,946,769 B2
(45) Date of Patent: Mar. 16, 2021

(54) CAPACITIVE OCCUPANT DETECTION SYSTEM WITH IMPROVED DISCRIMINATION CAPABILITY

(71) Applicant: IEE INTERNATIONAL ELECTRONICS & ENGINEERING S.A., Echternach (LU)

(72) Inventors: Frank Althaus, Saarbrücken (DE); Erik Holzapfel, Prüm (DE); David Hoyer, Trier (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 16/622,408

(22) PCT Filed: Jun. 15, 2018

(86) PCT No.: PCT/EP2018/065983
§ 371 (c)(1),
(2) Date: Dec. 13, 2019

(87) PCT Pub. No.: WO2018/229263
PCT Pub. Date: Dec. 20, 2018

(65) Prior Publication Data
US 2020/0198498 A1    Jun. 25, 2020

(30) Foreign Application Priority Data

Jun. 15, 2017  (LU) .......................... 100318

(51) Int. Cl.
*B60N 2/00* (2006.01)
*B60R 21/015* (2006.01)
(Continued)

(52) U.S. Cl.
CPC ........ *B60N 2/002* (2013.01); *B60R 21/01532* (2014.10); *B60N 2002/0272* (2013.01);
(Continued)

(58) Field of Classification Search
CPC ............ B60N 2/002; B60N 2002/0272; B60R 21/01532; B60R 21/0154; B60R 21/01556; G01G 19/4142
See application file for complete search history.

(56) References Cited

U.S. PATENT DOCUMENTS 6,161,070 A   12/2000  Jinno et al.
6,392,542 B1   5/2002  Stanley
(Continued)

FOREIGN PATENT DOCUMENTS

JP   2009132224 A   6/2009
WO   WO9217344 A1   10/1992
(Continued)

OTHER PUBLICATIONS

International Search Report corresponding to International Application No. PCT/EP2018/065983, dated Sep. 17, 2018, 3 pages.
(Continued)

*Primary Examiner* — Sze-Hon Kong
(74) *Attorney, Agent, or Firm* — Reising Ethington P.C.

(57) ABSTRACT

A capacitive seat occupancy detection and classification system with a capacitive sensor having at least two distinct antenna electrodes and a method of operating is proposed to reduce an impact of the sensor-to-object impedance $Z_{SO}$ on an object-to-ground impedance $Z_{OG}$ measurement that the system performs. By measuring the impedance between the different antenna electrodes by the system, additional information is obtainable that can be used to compensate the impact of the sensor-to-object impedance $Z_{SO}$ on the object-to-ground impedance. As one effect of combining both
(Continued)

impedance measurement results, the proposed system is able to determine the object-to-ground impedance $Z_{OG}$ completely independent from wear of ISOFIX anchorages or human objects touching the electric ground of the vehicle, thus ensuring a stable classification of the object over the entire vehicle lifetime. The method further enables high-resolution seat occupancy classification.

13 Claims, 5 Drawing Sheets

(51) Int. Cl.
   *B60N 2/02* (2006.01)
   *G01G 19/414* (2006.01)
(52) U.S. Cl.
   CPC ..... *B60R 21/0154* (2014.10); *B60R 21/01556* (2014.10); *G01G 19/4142* (2013.01)

(56) References Cited

U.S. PATENT DOCUMENTS

| | | |
|---|---|---|
| 6,703,845 B2 | 3/2004 | Stanley et al. |
| 7,521,940 B2 | 4/2009 | Koch et al. |
| 2006/0219460 A1 | 10/2006 | Wanami |
| 2009/0295199 A1 | 12/2009 | Kincaid et al. |
| 2011/0074447 A1 | 3/2011 | Ootaka |
| 2015/0367751 A1* | 12/2015 | Lamesch .......... B60N 2/56 297/180.12 |
| 2018/0022231 A1* | 1/2018 | Bennett .......... B60N 2/002 324/686 |
| 2018/0031511 A1* | 2/2018 | Kim .......... G01N 27/228 |
| 2018/0145543 A1* | 5/2018 | Piasecki .......... G01R 15/146 |
| 2020/0064410 A1* | 2/2020 | Tong .......... G01R 27/025 |

FOREIGN PATENT DOCUMENTS

| | | |
|---|---|---|
| WO | WO9513204 A1 | 5/1995 |
| WO | WO2014122197 A1 | 8/2014 |
| WO | WO2017102386 A1 | 6/2017 |
| WO | WO2018229172 A1 | 12/2018 |

OTHER PUBLICATIONS

Written Opinion corresponding to International Application No. PCT/EP2018/065983, dated Sep. 17, 2018, 5 pages.

J. Smith et al., "Electric Field Sensing for Graphical Interfaces", IEEE Computer Graphics and Applications, vol. 18 No. 3, dated May/Jun. 1998, pp. 54-60.

* cited by examiner

CAPACITIVE OCCUPANT DETECTION SYSTEM WITH IMPROVED DISCRIMINATION CAPABILITY

TECHNICAL FIELD

The invention relates to a capacitive sensing device, a seat occupancy detection and classification system comprising such capacitive sensing device, a method of operating such capacitive seat occupancy detection and classification system and a software module for carrying out the method.

BACKGROUND OF THE INVENTION

Seat occupant detection and/or classification devices are nowadays widely used in vehicles, in particular in passenger cars, for providing a seat occupant signal for various appliances, for instance for the purpose of a seat belt reminder (SBR) system or an activation control for an auxiliary restraint system (ARS). Seat occupant detection and/or classification systems include seat occupant sensors that are known to exist in a number of variants, in particular based on capacitive sensing. An output signal of the seat occupant detection and/or classification system is usually transferred to an electronic control unit of the vehicle to serve, for instance, as a basis for a decision to deploy an air bag system to the vehicle seat.

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode—which could comprise the one or more antenna electrodes themselves—at which the influence of an object or living being on the electric field is detected.

The different capacitive sensing mechanisms are for instance explained in the technical paper entitled "Electric Field Sensing for Graphical Interfaces" by J. R. Smith et al., published in IEEE Computer Graphics and Applications, 18(3): 54-60, 1998. The paper describes the concept of electric field sensing as used for making non-contact three-dimensional position measurements, and more particularly for sensing the position of a human hand for purposes of providing three-dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", which is alternatively referred to as "coupling mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling.

The capacitive coupling is generally determined by applying an alternating voltage signal to a capacitive antenna electrode and by measuring the current flowing from the antenna electrode either towards ground (in the loading mode) or into the second electrode (receiving electrode) in case of the coupling mode. This current is usually measured by means of a transimpedance amplifier, which is connected to the sensing electrode and which converts a current flowing into said sensing electrode into a voltage, which is proportional to the current flowing into the antenna electrode.

Some capacitive sensors are designed as sense-only capacitive sensors having a single sense electrode. Also, quite often capacitive sensors are used that comprise a sense electrode and a guard electrode that are proximally arranged and mutually insulated from each other. This technique of "guarding" is well known in the art and is frequently used for intentionally masking, and thus shaping, a sensitivity regime of a capacitive sensor. To this end, the guard electrode is kept at the same electric AC potential as the sense electrode. As a result, a space between the sense electrode and the guard electrode is free of an electric field, and the guard-sense capacitive sensor is insensitive in a direction between the sense electrode and the guard electrode.

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode.

U.S. Pat. No. 6,392,542 to Stanley teaches an electric field sensor comprising an electrode mountable within a seat and operatively coupled to a sensing circuit, which applies to the electrode an oscillating or pulsed signal having a frequency "at most weakly responsive" to wetness of the seat. Stanley proposes to measure phase and amplitude of the current flowing to the electrode to detect an occupied or an empty seat and to compensate for seat wetness.

Others had the idea of using the heating element of a seat heater as an antenna electrode of a capacitive occupancy sensing system. International application WO 92/17344 A1 discloses an electrically heated vehicle seat with a conductor, which can be heated by the passage of electrical current, located in the seating surface, wherein the conductor also forms one electrode of a two-electrode seat occupancy sensor.

International application WO 95/13204 A1 discloses a similar system, in which the oscillation frequency of an oscillator connected to the heating element is measured to derive the occupancy state of the vehicle seat. More elaborate combinations of a seat heater and a capacitive sensor are disclosed, for instance, in U.S. Pat. No. 7,521,940 B2, US 2009/0295199 A1 and U.S. Pat. No. 6,703,845.

Capacitive antenna electrodes are generally designed in order to substantially cover the entire seating surface of the vehicle seat. This ensures that a passenger may be reliably detected even if the passenger is sitting in an unnatural way on the seat, e.g. on the front-most position of the vehicle seat.

The capacitive sensing system should be able to distinguish an empty seat or a seat equipped with a child restraint seat (CRS), from a person directly sitting on the seat.

A reliable capability of distinguishing between potential seat occupant classes is essential for fulfilling high safety requirements. Compared to vehicle seat classification systems conducting mechanical load-based resistive measurements that are also known in the art, a capacitive measurement has the advantages of a simpler wiring and a stable and reproducible measurement over an entire temperature range as specified in common vehicle requirements.

A seat occupant detection and classification system, in particular for detecting and classifying a seat occupancy of a vehicle seat, that is based on capacitive sensing measures a physical quantity, for instance an electric current through a capacitive sensor member or a complex impedance or admittance of the capacitive sensor member, wherein the physical quantity is representative of an electric field between at least one sense electrode of the capacitive sensor member and a vehicle body.

The at least one sense electrode may be positioned on or inside the vehicle seat. A seat occupant or an object which is placed on the vehicle seat will modify the electric field of the sense electrode, resulting in a change of the measured physical quantity.

Vehicle seat occupant classification systems based on capacitive sensing are subject to being misled in the case of vehicle-grounded objects being placed on a vehicle seat, for instance a CRS, such as an ISOFIX child seat, that in an installed state is grounded by mechanically connecting the CRS to anchorages that are fixedly attached to the vehicle body. ISOFIX child restraint systems are equipped with metallic clips that are configured for quick fixation at the anchorages. The metallic clips are part of a metal frame arranged inside the CRS. This metal frame could come close to the antenna electrode within a few millimeters. Depending on the proximity of the grounded CRS metal frame to the at least one antenna electrode of the capacitive sensor member, the sensed physical quantity might be large enough to cause the vehicle seat occupant classification system to classify a CRS electrically connected to vehicle ground as a "person sitting directly on seat".

A problem concerning a capacitive sensing device, measuring a capacitive coupling between an antenna electrode and vehicle ground might occur as follows:

with a non grounded CRS, a seat equipped with a CRS is sensed as low capacity, whereas a person sitting directly on seat is sensed as high capacitance;
with a grounded CRS installed on the seat, the system senses a high capacitance, which may create a misclassification.

Moreover, another problem exists in that usually the ISOFIX anchorages are paint coated, and hence galvanically insulated, on a new vehicle. Each time the ISOFIX CRS is installed, some of the paint coating is removed. As a consequence, the degree of grounding of the ISOFIX CRS metal frame changes over its lifetime and corresponding usage. On new ISOFIX anchorages, the CRS has a well-defined impedance to the ISOFIX anchorages, the impedance depending on the type of paint. After the paint is fully removed the CRS is fully grounded. This intermediate behavior is noticeable in the measurement of an impedance to ground, as is illustrated in the graph in FIG. 6.

In the graph of FIG. 6, the axis of abscissas shows the electrical conductance of a measured impedance to ground, and the axis of ordinates shows the imaginary portion of the measured impedance to ground, representing a capacitance.

If the CRS is mechanically connected and galvanically insulated to the ISOFIX anchorages, a low impedance value INS1 will be measured. If the CRS has a galvanic connection to the ISOFIX anchorages and is fully grounded by the passenger seat frame, a high impedance value GND1 will be measured. The lowest possible impedance for a seat occupancy by a human being is shown by impedance value HUM1. If the paint coating of the ISOFIX anchorages is removed by frequent re-installation and removal of the CRS, every value in between impedance values INS1 and GND1 could possibly be measured. This is illustrated in FIG. 6 by dashed lines. A measureable impedance with regard to ground potential increases the more the better the ISOFIX arms of the CRS are connected to ground potential. In such cases, an ability of the vehicle seat occupant classification system to correctly classify a seat occupancy might be affected.

SUMMARY

It is therefore an object of the present invention to provide a seat occupant classification system with high functional robustness, in particular a vehicle seat occupant classification system, that enables a correct classification of a CRS that is being installed with ISOFIX system and that is electrically connected to vehicle ground.

Moreover, it is desirable that the capability of a seat occupant classification system with regard to reliably and correctly classifying a seat occupancy shall encompass high-resolution seat occupancy classes such as child, $5^{th}$ percentile female, $50^{th}$ percentile female, $50^{th}$ percentile male, etc., in order to facilitate complying with vehicle requirements such as the New Car Assessment Program (NCAP) safety protocols by the National Highway Traffic Safety Administration (NHTSA).

In one aspect of the present invention, the object is achieved by a capacitive sensing device for a seat occupancy detection and classification system. The capacitive sensing device includes a capacitive sensor, an impedance measurement circuit and a signal processing unit.

The capacitive sensor includes at least a first electrically conductive antenna electrode and at least a second electrically conductive antenna electrode that are mutually galvanically separate from each other. The term "galvanically separate", as used in this application, shall particularly be understood to not conduct an electric direct current (DC) between galvanically separate objects.

The impedance measurement circuit comprises at least one signal voltage source that is configured for providing, with reference to a ground potential, a periodic electrical measurement signal at an output port, and at least one sense current measurement means that is configured to measure complex sense currents with reference to a reference voltage.

The impedance measurement circuit is configured and electrically connected to the capacitive sensor such that both the first antenna electrode and the second antenna electrode are electrically connectable to the output port for receiving the electrical measurement signal. Further, at least one of the first and second antenna electrode is alternately electrically connectable to the ground potential, i.e. the least one of the first and second antenna electrode is electrically connectable either to the ground potential or to the output port.

A complex sense current is being generated by the provided periodic measurement signal in each one of the antenna electrodes if one of the electrodes is connected to the output port.

The phrase "electrically connectable/electrically connected", as used in this application, shall be understood to encompass galvanic electrical connections as well as operational electrical connections established e.g. by capacitive and/or inductive electromagnetic coupling or electrical connections obtained by referencing the antenna electrode to ground potential by means of drivers, operational amplifiers or the like.

The phrases "configured to" and "configured for", as used in this application, shall in particular be understood as being specifically programmed, laid out, furnished or arranged.

It is further noted herewith that the terms "first" and "second" are used in this application for distinction purposes only, and are not meant to indicate or anticipate a sequence or a priority in any way.

The signal processing unit is configured to determine, with reference to the ground potential, a complex impedance of at least one of the two antenna electrodes from a measured complex sense current through the respective antenna electrode with the first antenna electrode being electrically connected to the output port. In the following, impedances with reference to ground potential may briefly be referred to as "impedance to ground".

The signal processing unit is further configured to determine a complex impedance between the two antenna electrodes from individually measured complex sense currents through the two antenna electrodes with one of the first and second antenna electrode being electrically connected to the ground potential. In the following, these impedances may briefly be referred to as "impedance between electrodes". It will be appreciated that the expression "complex impedance between the two antenna electrodes" in the context of the present invention denotes the value of the impedance which is determined by the complex sense currents flowing out of or into the respective antenna electrodes. The skilled person will note, that these sense currents are also influenced e.g. by a coupling of the electrodes to ground, e.g. via an occupant of the seat. It follows that the "impedance between electrodes" is to be generally understood as the impedance of the complex environment that is "visible" between the two electrodes.

Then, the signal processing unit is configured to provide output signals that are representative of the determined complex impedances.

As will be described below, the above-mentioned technical problems can be solved by measuring an impedance to ground of at least one of the antenna electrodes and an impedance between the antenna electrodes and by suitably combining the two measured impedances.

In this way, occurrence of measurement conditions with ambiguities regarding classifying seat occupancies can be prevented, and a capacitive sensing device with high functional robustness with regard to reliably and correctly detecting and classifying seat occupancies with high-resolution performance can be provided.

Instead of determining complex impedances from measured currents, the signal processing unit may be configured to determine complex admittances from measured currents without any change of the disclosed subject-matter of the invention, as the real parts and the imaginary parts of a complex impedance and its corresponding complex admittance are interrelated by a one-to-one correspondence, as will readily be appreciated by those skilled in the art.

In particular, the capacitive sensing device may be used for a vehicle seat occupancy detection and classification system. The term "vehicle", as used in this application, shall particularly be understood to encompass passenger cars, trucks and buses.

Preferably, the first antenna electrode and the second antenna electrode are arranged to mainly cover distinct portions of a seat cushion of a seat. For instance, the first antenna electrode can be arranged to cover a center region of a seat cushion, and the second antenna electrode can be arranged to at least partially cover at least one side region of the seat cushion. The second antenna electrode may also comprise two electrode members which are galvanically connected to each other. Each electrode member preferably covers one side region of the seat cushion such that the first antenna electrode is arranged between the two electrode members of the second antenna electrode. The first antenna electrode and the second antenna electrode can as well be arranged in a juxtaposed manner such that each antenna electrode covers one side region of the seat cushion and an adjacent portion of the center region of the seat cushion.

It will be appreciated, that the capacitive sensing device may comprise one signal voltage source and one sense current measurement means per antenna electrode, i.e. that each antenna electrode has one dedicated signal voltage source and one sense current measurement means operably associated. When measuring in loading mode, i.e. when determining, with reference to the ground potential, a complex impedance of the antenna electrodes, both signal voltage sources are generating the same signal (synchronized in phase and same magnitude). Each sense current measurement means measures the value of the current flowing from its own electrode to vehicle GND.

When measuring in coupling mode, i.e. when determining the complex impedance between the two antenna electrodes, the signal voltage source of the first electrode antenna is generating a signal and the signal voltage source of the second electrode antenna is set to zero. The current meter of the first electrode measures the transmitted current. The sense current measurement means of the second electrode measures the received current. It will be noted that during coupling mode measurement, the second electrode may be connected to ground by actively referencing the driver or signal generator assigned to this electrode to ground potential. The complex sense currents current flowing into ground may then preferably be measured by measuring the current in the driver or signal generator required to reference the antenna to ground. This has the advantage that the phase relation with regard to the periodic electrical measurement signal will be known.

In one aspect of the present invention, the object may be achieved by a seat occupancy detection and classification system, in particular a vehicle seat occupancy detection and classification system, including a capacitive sensing device as disclosed herein, wherein the capacitive sensor is electrically connected to the impedance measurement circuit such that an individual complex sense current through any antenna electrode of the two antenna electrodes is measurable by the impedance measurement circuit.

The seat occupancy detection and classification system further comprises a control and evaluation unit that is configured:

to receive the output signals provided by the signal processing unit, to calculate a new complex impedance with regard to the ground potential using the determined complex impedance with reference to the ground potential of at least one of the two antenna electrodes and the determined complex impedance between the two antenna electrodes, to compare the calculated new complex impedance with at least one predetermined threshold value, and, based on the result of the comparing, to determine a seat occupancy class.

By measuring an impedance to ground of one of the antenna electrodes and an impedance between electrodes and by suitably combining the two, a capacitive seat occupancy detection and classification system with high functional robustness with regard to reliably and correctly detecting and classifying seat occupancies with high-resolution performance can be provided.

In some embodiments of the seat occupancy detection and classification system, the capacitive sensor is electrically connectable to the impedance measurement circuit such that the first antenna electrode is electrically connectable alternately to the ground potential and to the output port. In this way, an automatic measurement of the impedance to ground of one of the antenna electrodes and the impedance between the electrodes in a reliable manner can be facilitated.

In some embodiments of the seat occupancy detection and classification system, the capacitive sensing device is configured to periodically change an electrical connection of the second antenna electrode from being electrically connected to the ground potential to being electrically connected to the output port for a predetermined time period and back to being electrically connected to the ground potential after the time period has elapsed. When a suitable predetermined time period is selected, a quasi-continuous operation of the seat occupancy detection and classification system can be accomplished with virtually no restriction to an operational availability.

The skilled person will appreciate, that the switching of the electrical connection of an antenna between the ground potential and the output port may be achieved by any suitable switching means, such as e.g. a remote controlled switch member. It will further be appreciated that the establishment of the connection may be achieved indirectly or "logically" by supplying an appropriate reference signal to the reference input of a transimpedance amplifier used for determining the current flowing into the respective antenna electrode. This "switching" operation is preferably done in an associated application specific integrated circuit (ASIC). The establishment of the required connections is preferably controlled by a microcontroller, e.g. included in the ASIC.

It will be appreciated, that the capacitive sensor is preferably electrically connectable to the impedance measurement circuit such that also the second antenna electrode is electrically connectable alternately to the ground potential and to the output port. In such an embodiment, the impedance between the electrodes may be determined in both directions, i.e. from the first antenna to the second antenna and from the second antenna to the first antenna. Performing two coupling mode measurements in different directions may help to eliminate parasitic effects e.g. due to additional ground coupling of one of the electrodes or due to electrodes being different in size.

In some embodiments of the capacitive seat occupancy detection and classification system, the control and evaluation unit is configured to generate a classification output signal that is indicative of the determined seat occupancy class. The classification output signal of the control and evaluation unit can beneficially be transferred to an electronic control unit of the vehicle to serve, for instance, as a basis for a decision to deploy an air bag system to the vehicle seat.

In yet another aspect of the present invention, the object is achieved by a method of operating one of the disclosed capacitive seat occupancy detection and classification systems.

The method includes steps of:

providing the periodic electrical measurement signal to at least one of the antenna electrodes by connecting it to the output port, determining a complex impedance to ground of at least one of the two antenna electrodes from a complex sense current that is being generated in the respective antenna electrode in response to the provided periodic electrical measurement signal, determining a complex impedance between the two antenna electrodes from measured individual complex sense currents through the two antenna electrodes when the second antenna electrode is electrically connected to the ground potential, calculating a new complex impedance with regard to ground potential (new "complex impedance to ground") using one of the at least one determined complex impedances with reference to ground potential and the determined complex impedance between the two antenna electrodes, comparing the new complex impedance to ground with at least one predetermined threshold value, and determining a seat occupancy class for the calculated new complex impedance to ground, depending on a relation between the calculated new complex impedance to ground and the at least one predetermined threshold value.

The benefits described in context with the capacitive seat occupancy detection and classification system apply to the disclosed method to the full extent.

The relation between the determined complex impedance to ground and the at least one predetermined threshold value for complex impedances to ground may be one out of "larger than", "lower than" or "equal to". The relation may also comprise a constant factor, such as for instance "larger than 1.2 times".

In some embodiments, the method steps may be carried out automatically and periodically.

In a possible embodiment, the method includes the step of determining an additional complex impedance between the two antenna electrodes from measured individual complex sense currents through the two antenna electrodes when the first antenna electrode is electrically connected to the output port and the second antenna electrode is electrically connected to the ground potential, and wherein the step of calculating a new complex impedance with regard to the ground potential comprises using:

one of the at least one determined complex impedances with reference to the ground potential, and the determined complex impedance and the additional complex impedance between the two antenna electrodes.

As is explained above, performing two coupling mode measurements in different directions may help to eliminate parasitic effects e.g. due to additional ground coupling of one of the electrodes or due to electrodes being different in size.

In some embodiments of the method, the step of calculating the new complex impedance includes a calculation according to:

new complex impedance=determined complex impedance with reference to the ground potential×scaling factor+determined complex impedance between the two antenna electrodes.

The scaling factor has to be chosen suitably depending on the configuration of the antenna system. In case of symmetrical antenna electrodes, the scaling factor is preferably chosen to be equal or close to 0.5.

As has been described with reference to FIG. 6, every value in between values INS1 and GND1 could possibly be measured as an impedance to ground if the paint of the ISOFIX anchorages is removed by frequent re-installation and removal of the CRS, affecting the ability of a vehicle seat occupant detection and classification system to correctly classify a seat occupancy.

A similar behavior is valid for the measurement of the impedance between electrodes, which is illustrated in FIG. 7, following the same presentation as in FIG. 6. If the CRS is mechanically connected and galvanically insulated to the ISOFIX anchorages, a high impedance value INS2 will be measured. If the CRS has a direct connection to the ISOFIX anchorages and is fully grounded by the passenger seat frame, a low impedance value GND2 will be measured. The lowest possible impedance for a seat occupancy human position is shown by impedance value HUM2. If the paint coating of the ISOFIX anchorages is removed by frequent re-installation and removal of the CRS, every value in between impedance values INS2 and GND2 could possibly be measured. This is illustrated in FIG. 7 by dashed lines. A measureable impedance between electrodes decreases the more the better the ISOFIX arms of the CRS are connected to ground.

The proposed method is based on the empirical insight that the impact of the changing grounding condition of the CRS on the measurement of the impedance between electrodes is always sign-inverted and in case of symmetrical antenna electrodes about half of the impact on the measurement of the impedance to ground.

By combining both measured impedances in the disclosed manner, the resulting new complex impedance to ground is completely independent from an object-to-ground connection and thus enables a detection and classification of the CRS independent of its grounding condition.

In a two electrode system, the method preferably comprises performing three measurements:

Loading Mode Measurement: both antenna electrodes are driven by sinusoidal excitation signals—signals in phase and of equal amplitude. One measures a current or at least a signal being representative of the current which is flowing out of the antenna electrode into the unknown load (=unknown impedance network). The current is referenced to the excitation signal.

As stated above, the application of a signal to an antenna electrode may be achieved indirectly or "logically" by supplying an appropriate reference signal to the reference input of a transimpedance amplifier used for determining the current flowing into the respective antenna electrode. In a possible embodiment, the sinusoidal signal is therefore input to the two transimpedance amplifiers connected to the two antenna electrodes.

Coupling Mode Measurement 1 (e.g. Left-to-right/Inner-to-outer electrode): Electrode 1 is connected to the sinusoidal excitation signal (e.g. by feeding sinusoidal signal to the reference input of a transimpedance amplifier connected to electrode 1). Electrode 2 is "actively grounded" (e.g. by operably connecting the reference input of the transimpedance amplifier connected to electrode 2 to GND). The respective measures comprise the current flowing "out of" electrode 1 and the current flowing "into" electrode 2.

Coupling Mode Measurement 2 (e.g. Right-to-left/Outer-to-Inner electrode): Electrode 2 is connected to the sinusoidal excitation signal (e.g. by feeding sinusoidal signal to the reference input of a transimpedance amplifier connected to electrode 2). Electrode 1 is "actively grounded" (e.g. by operably connecting the reference input of the transimpedance amplifier connected to electrode 1 to GND). The respective measures comprise the current flowing "out of" electrode 2 and the current flowing "into" electrode 1.

The method then further uses the currents to calculate impedance values for the components in a model which we consider to be a simplified representation of the coupling paths in the real world.

Therefore in some embodiments of the method, wherein the step of determining a complex impedance to ground is conducted for both the two antenna electrodes, and the step of determining the complex impedance the two antenna electrodes is conducted in both directions, i.e. from the first antenna electrode to the second antenna electrode and from the second antenna electrode to the first antenna electrode, the step of calculating the new complex impedance includes a calculation according to formula (2):

$$\frac{Z_{OG}}{U} = \frac{(2 \times I_{rxS1-S2} - I_{txS1-S2}) \times I_{rxS2-S1} - I_{txS2-S1} \times I_{rxS1-S2}}{(I_{tx\_S1} + I_{tx\_S2}) \times (I_{rxS1-S2} \times I_{rxS2-S1} - I_{txS1-S2} \times I_{txS2-S1})}$$

wherein the following notation holds (i, j=1, 2)

$I_{tx\_Si}$: the measured complex sense current in the i-th antenna electrode when determining the complex impedance to ground when antenna electrode Si is connected to the output port for receiving the periodic electrical measurement signal (i.e. when antenna electrode Si acts as transmitting electrode Tx), $I_{txSi-Sj}$: the complex sense current flowing out of the antenna electrode Si when antenna electrode Si is connected to the output port for receiving the periodic electrical measurement signal (i.e. when antenna electrode Si acts as transmitting electrode Tx) and electrode Sj is connected to ground, and $I_{rxSi-Sj}$: the complex sense current flowing into the antenna electrode Sj when antenna electrode Sj is connected to ground (i.e. when antenna electrode Sj acts as receiving electrode $R_x$) and electrode Si is connected to the output port for receiving the periodic electrical measurement signal.

The above naming method is based on the model, that in a coupling mode measurement (see also FIG. 5), we refer to the antenna electrode being connected to the signal generator as TX electrode and the electrode being "virtually" connected to GND as RX electrode. Further we define that that a current is always flowing from generator to GND. It follows that $I_{txSi-Sj}$ represents the current flowing out of the TX electrode/generator (therefore $I_{tx}$ ...) when (electrode Si is connected to generator/Tx) AND (electrode Sj is connected to gnd/Rx) with the underlying logic that the current flows from Tx to Rx.

Likewise $I_{rxSi-Sj}$ represents the current flowing into the Rx electrode/generator (therefore $I_{rx}$ ...) when (electrode connected to generator/Tx=Si) AND (electrode connected to gnd/Rx=Sj) ... logics: current flows Tx→Rx According to the above explanations, we preferably have two coupling modes in each of which the electrodes' functions are defined (Rx or Tx) and in which a Tx and a Rx current can be measured:

Coupling Mode 1:
ItxS1-S2 Current out of 1, when 1=Tx AND 2=Rx
IRxS1-2 Current into 2, when 1=Tx AND 2=Rx Coupling Mode 2:
ItxS2-S1 Current out of 2, when 2=Tx AND 1=Rx
IRxS2-S1 Current into 1, when 2=Tx AND 1=Rx A schematic configuration of electric fields at the antenna electrodes of the seat occupancy detection and classification system during a measurement of an impedance to ground of each one of the two antenna electrodes 18, 20 is provided in FIG. 2. An equivalent electrical circuit for a measurement of an impedance to ground of each one of the two antenna electrodes is given in FIG. 3. As shown, the first antenna electrode 18 is connected to the output port of the signal voltage source, which is providing a periodic electrical measurement signal with reference to a ground potential 38 at the output port. In a first electric loop, the sense current measurement means measures the current $I_{tx\_S1}$ through the first antenna electrode 18. In a second electric loop, the sense current measurement means measures the current $I_{tx\_S2}$ through the second antenna electrode 20.

From the equivalent electrical circuit one obtains:

$$\frac{U}{I_{tx\_S1} + I_{tx\_S2}} = \frac{Z_{S1-O} * Z_{S2-O}}{Z_{S1-O} + Z_{S2-0}} + Z_{OG}$$

The sensor-to-object impedances $Z_{S1-O}$ and $Z_{S2-O}$ are mainly defined by the conductance of the object, the distance of the object to the antenna electrode and the surface of the antenna electrode that the object is covering. The conductance of all human objects is fairly similar. The distance is mainly defined by a thickness of a trim used on the vehicle seat and a thickness of the object's clothing. The surface of the antenna electrode that the object is covering is similar for the different types of human objects. The object-to-ground impedance $Z_{OG}$ is mainly defined by a distance of the object to the ground and by a volume of the object. The sensor-to-object impedances $Z_{S1-0}$ and $Z_{S2-O}$ and the object-to-ground impedance $Z_{OG}$ are of same magnitude.

A schematic configuration of electric fields at the antenna electrodes of the seat occupancy detection and classification system during a measurement of an impedance between antenna electrodes 18, 20 is provided in FIG. 4. An equivalent electrical circuit for a measurement of an impedance between electrodes is given in FIG. 5 for one direction of coupling mode measurement with antenna electrode S2 being connected to the signal voltage source and antenna electrode S1 being connected to ground. As shown, the first antenna electrode 18 is connected to ground potential 38. In the second electric loop, the sense current measurement means measures the current $I_{tx\_S2-S1}$ through the second antenna electrode 20. In the other electric loop, the sense current measurement means measures the current $I_{rx\_S2-S1}$ through the first antenna electrode 18.

From the equivalent electrical circuit one obtains:

$$Z_{OG}*(I_{txS2-S1} - I_{rxS2-S1}) = Z_{S1}*I_{rxS2-S1}$$

FIG. 5 shows the coupling mode measurement only for one direction with antenna electrode S2 being connected to the signal voltage source and antenna electrode S1 being connected to ground. The skilled person will appreciate that the coupling mode measurement in the other direction, i.e with antenna electrode S1 being connected to the signal voltage source and antenna electrode S2 being connected to ground is similar.

By measuring the impedance to ground and the impedances between electrodes, the influence of the sensor-to-object impedances $Z_{S1-O}$ and $Z_{S2-O}$ can completely be eliminated, and the object-to-ground impedance $Z_{OG}$ can directly be calculated as the new complex impedance by the disclosed formula (2).

The object-to-ground impedance $Z_{OG}$ is strongly linked to the volume of the conductive object on the seat. In this way, a high-resolution seat occupancy classification can be accomplished for the seat occupancy detection and classification system.

By combining with the aforementioned design of the first and second antenna electrode being arranged to mainly cover distinct portions of a seat cushion of a seat in a direction perpendicular to the seat cushion, an even higher resolution for a seat occupancy classification can be achieved.

In yet another aspect of the invention, a software module for controlling an automatic execution of steps of an embodiment of the method disclosed herein is provided.

The method steps to be conducted are converted into a program code of the software module, wherein the program code is implementable in a non-transitory computer-readable medium such as a digital data memory unit of the capacitive vehicle seat occupancy detection and classification system and is executable by a processor unit of the capacitive vehicle seat occupancy detection and classification system. Preferably, the digital data memory unit and/or processor unit may be a digital data memory unit and/or a processing unit of the evaluation unit of the capacitive vehicle seat occupancy detection and classification system. The processor unit may, alternatively or supplementary, be another processor unit that is especially assigned to execute at least some of the method steps.

The software module can enable a robust and reliable execution of the method and can allow for a fast modification of method steps.

In yet another aspect of the invention, a seat, in particular a vehicle seat, with an installed capacitive seat occupant detection and classification system as disclosed herein is provided. The seat comprises a seat cushion having at least one seat foam member and a seat base that is configured for receiving at least a portion of the seat cushion. The seat base and the seat cushion are provided for supporting a bottom of a seat occupant. The seat further includes a backrest that is provided for supporting a back region of the seat occupant. The capacitive sensor is arranged at at least one out of the seat cushion and the backrest.

In this way, a seat, in particular a vehicle seat, with a robust and reliable high-resolution seat occupancy detection and classification can be provided.

In a preferred embodiment of the seat, at least one out of the first antenna electrode and the second antenna electrode is formed by an electrical seat heater member that is installed in the seat. This embodiment combines the advantage of a robust and reliable high-resolution seat occupancy detection and classification with the benefit of hardware savings.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

Figure 1:
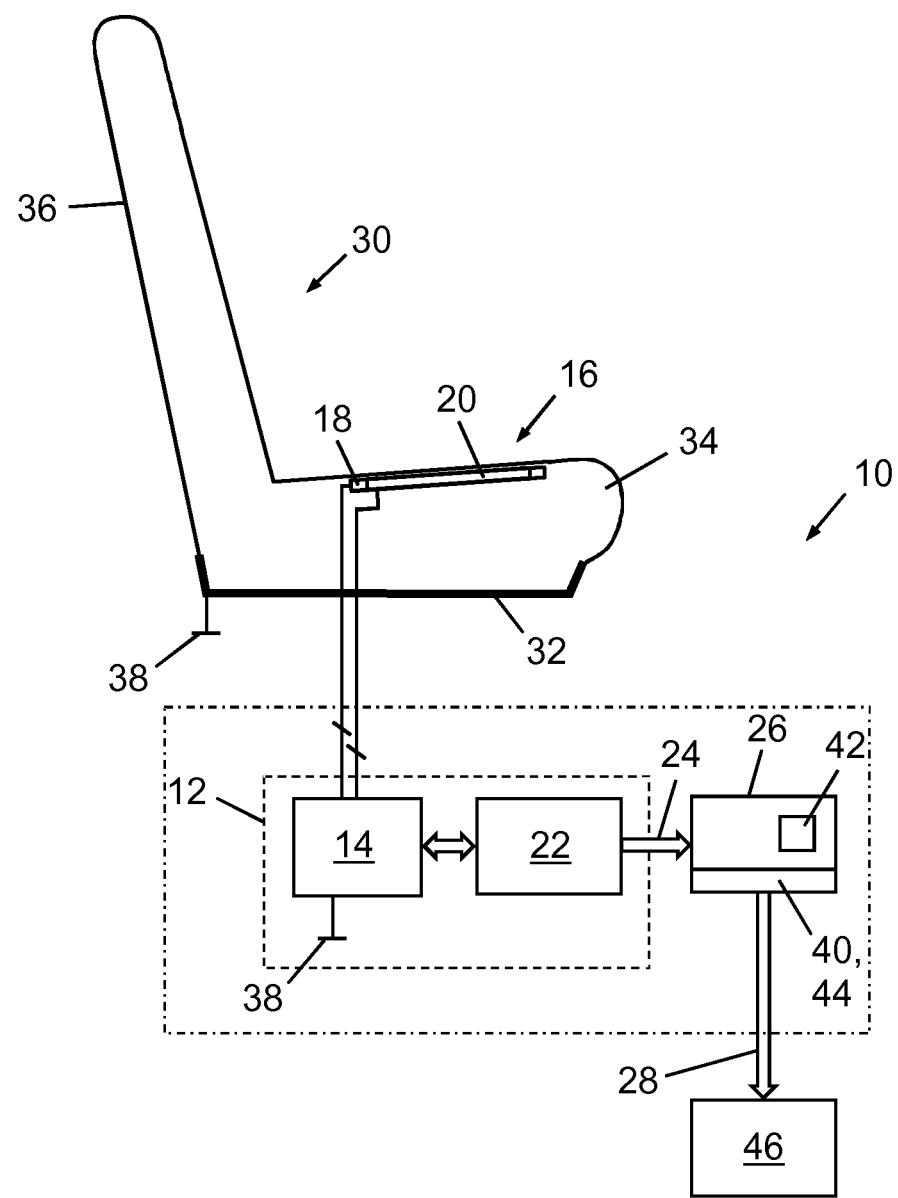
FIG. 1 schematically illustrates a vehicle seat in a side view with an installed embodiment of a seat occupancy detection and classification system in accordance with the invention.
Figure 2:
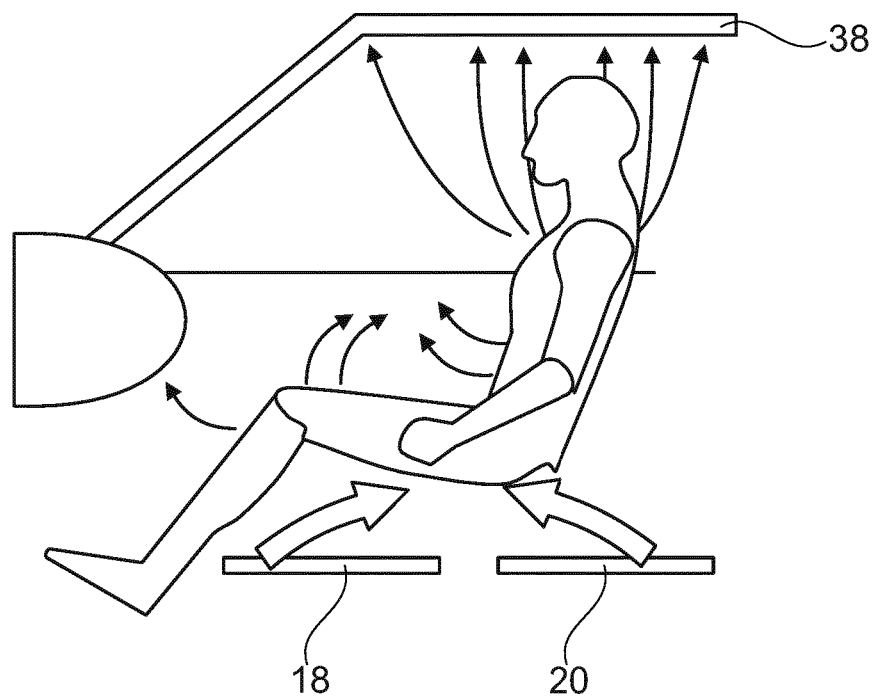
FIG. 2 schematically illustrates a configuration of electric fields at the antenna electrodes of the seat occupancy detection and classification system pursuant to FIG. 1 during measurement of impedance to ground in a side view of the vehicle seat.

FIG. 1 schematically shows a side view of a seat 30 formed as a vehicle seat, comprising a capacitive seat occupancy detection and classification system 10 in accordance with the invention. The vehicle seat is designed as a seat of a passenger car and includes a seat structure (not shown) by which it is erected on a passenger cabin floor of the passenger car, as is well known in the art.

The seat 30 further includes a seat base 32 supported by the seat structure and configured for receiving a seat cushion 34 for providing comfort to a seat occupant. The seat cushion 34 of the vehicle seat comprises a seat foam member and a fabric cover, which has been omitted in FIG. 1. The seat base 32 and the seat cushion 34 are provided for supporting a bottom of the seat occupant. A backrest 36 of the seat 30 is provided as usual for supporting a back of the seat occupant.

The vehicle seat occupant detection and classification system 10 includes a capacitive sensor 16, a capacitive sensing device 12 and a control and evaluation unit 26. The capacitive sensor 16 is located on the A-surface of the seat cushion 34, underneath the fabric cover. The capacitive sensing device 12 and the control and evaluation unit 26 are installed in the vehicle, remote from the vehicle seat. An output port of the control and evaluation unit 26 is connected to an airbag control unit 46. The capacitive sensing device 12 comprises an impedance measurement circuit 14 and a signal processing unit 22.

The impedance measurement circuit 14 includes a signal voltage source that is configured for providing, with reference to a ground potential 38, a periodic electrical measurement signal at an output port, and sense current measurement means that are configured to measure complex sense currents with reference to a reference voltage. The sense current measurement means may be formed as transimpedance amplifiers, each of which is connected to a sensing antenna electrode and which converts a current flowing into the sensing antenna electrode into a voltage, which is proportional to the current flowing into the sensing antenna electrode. In principle, any other sense current measurement means could be employed that appears to be suitable to those skilled in the art.

The capacitive sensor 16 comprises a first electrically conductive antenna electrode 18 (in the following also referred to as "first antenna electrode") and a second electrically conductive antenna electrode 20 (in the following also referred to as "second antenna electrode") that are mainly horizontally arranged close to the A surface of the seat cushion 34 and are mutually galvanically separate from each other.

The first antenna electrode 18 has a generally rectangular shape and covers a central portion of the seat cushion 34 in a direction perpendicular to the seat cushion 34. The second antenna electrode 20 comprises two electrode members that are galvanically connected to each other. Each electrode member has a generally rectangular shape and covers one of the side regions of the seat cushion 34 such that the first antenna electrode 18 is arranged between the two electrode members of the second antenna electrode 20 in a spaced manner in a direction perpendicular to the normal seating direction.

In a possible embodiment, the first antenna electrode 18 and the second antenna electrode 20 may be made from thin conductive foil, e.g. made of aluminum. Alternatively, they can be made from an aluminized plastic material such as polyethylene terephthalate (PET). The impedance measurement circuit 14 is electrically connected to the capacitive sensor 16 such that the first antenna electrode 18 is electrically connectable via a controllable switch member (not shown) either to the ground potential 38 or to the output port. The second antenna electrode 20 is permanently electrically connected to the output port for receiving the electrical measurement signal.

In this shown embodiment, both the antenna electrodes 18, 20 are made from a thin conductive foil or provided as printed conductive patches on a suitable, isolating carrier foil. In an alternative embodiment, only the first antenna electrode 18 is made from a thin conductive foil or provided as printed conductive patches on a suitable, isolating carrier foil, while the second antenna electrode 20 is formed by an electrical seat heater member that is installed in the vehicle seat, as is well known in the art. The operating principle of the capacitive seat occupancy detection and classification system 10 disclosed herein as well applies to such an alternative embodiment.

The complex sense currents to be individually sensed by the current measurement means of the impedance measurement circuit 14 are being generated in the second electrically conductive antenna electrode 20 and, when connected to the output port, in the first electrically conductive antenna electrode 18 by the provided periodic measurement signal, i.e. the regular operating mode of the capacitive sensor 16 is the loading mode.

The signal processing unit 22 is configured to determine complex impedances from the individually measured complex sense currents through the second antenna electrode 20 and, when connected to the output port, through the first electrically conductive antenna electrode 18, with reference to the ground potential 38 ("impedance to ground"). Further, the signal processing unit 22 is configured to determine a complex impedance between the two antenna electrodes 18, 20 from measured individual complex sense currents through the two antenna electrodes 18, 20 ("impedance between electrodes"). Moreover, the signal processing unit 22 is configured to provide output signals 24 that are representative of the determined complex impedances.

The control and evaluation unit 26 is configured to receive the output signals 24 provided by the signal processing unit 22, and to calculate a new complex impedance to ground using the determined complex impedance to ground of at least one of the first antenna electrode 18 and the second antenna electrode 20 and the determined complex impedance between electrodes.

Further, the control and evaluation unit 26 is configured to compare the calculated new complex impedance with a plurality of predetermined threshold values. Based on the result of the comparing, the control and evaluation unit 26 is configured to determine a seat occupancy class.

In the following, an embodiment of a method of operating the capacitive seat occupancy detection and classification system 10 pursuant to FIG. 1 will be described. A flowchart of the method is provided in FIG. 8. In preparation of using the capacitive seat occupancy detection and classification system 10, it shall be understood that all involved units and devices are in an operational state and configured as illustrated in FIG. 1.

In order to be able to carry out the method, the control and evaluation unit 26 comprises a software module 44. The method steps to be conducted are converted into a program code of the software module 44. The program code is implemented in a digital data memory unit 40 of the control and evaluation unit 26 and is executable by a processor unit 42 of the control and evaluation unit 26. Alternatively, the software module 44 may as well reside in and may be executable by a control unit of the vehicle, for instance by the airbag control unit 46, and established data communication means between the control and evaluation unit 26 and the airbag control unit 46 of the vehicle would be used for enabling mutual transfer of data.

Figure 3:
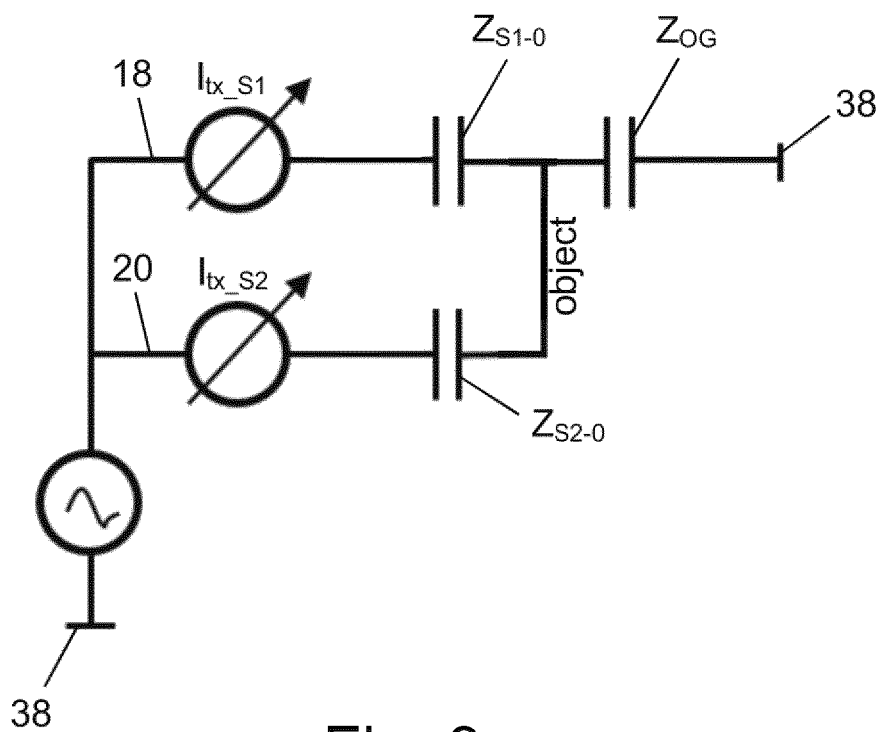
FIG. 3 schematically shows an equivalent electrical circuit of the antenna electrodes and the impedance measurement circuit of the seat occupancy detection and classification system pursuant to FIG. 1 during measurement of impedance to ground.
Figure 4:
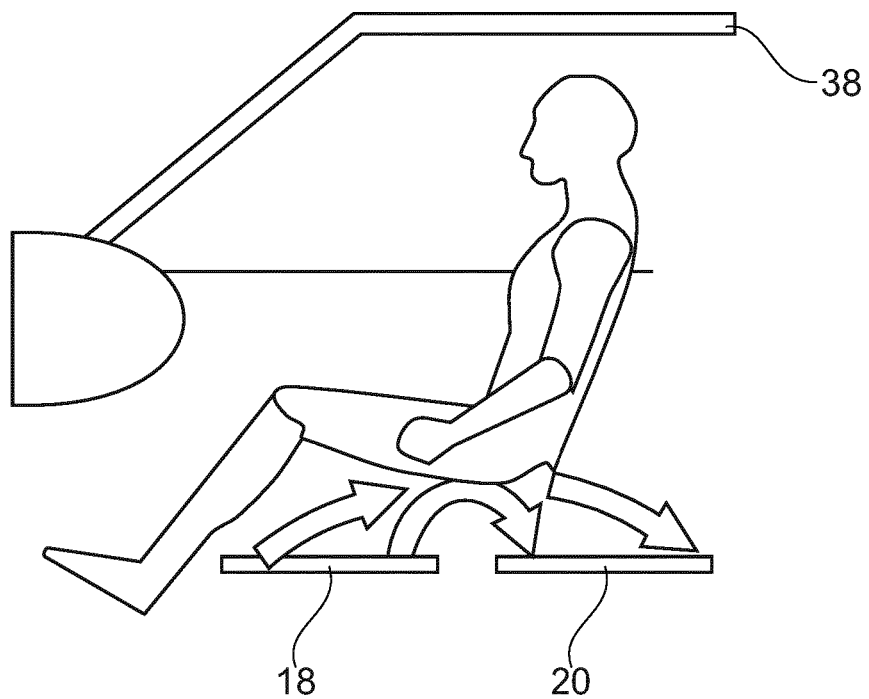
FIG. 4 schematically illustrates a configuration of electric fields at the antenna electrodes of the seat occupancy detection and classification system pursuant to FIG. 1 during measurement of impedance between electrodes in a side view of the vehicle seat.
Figure 8:
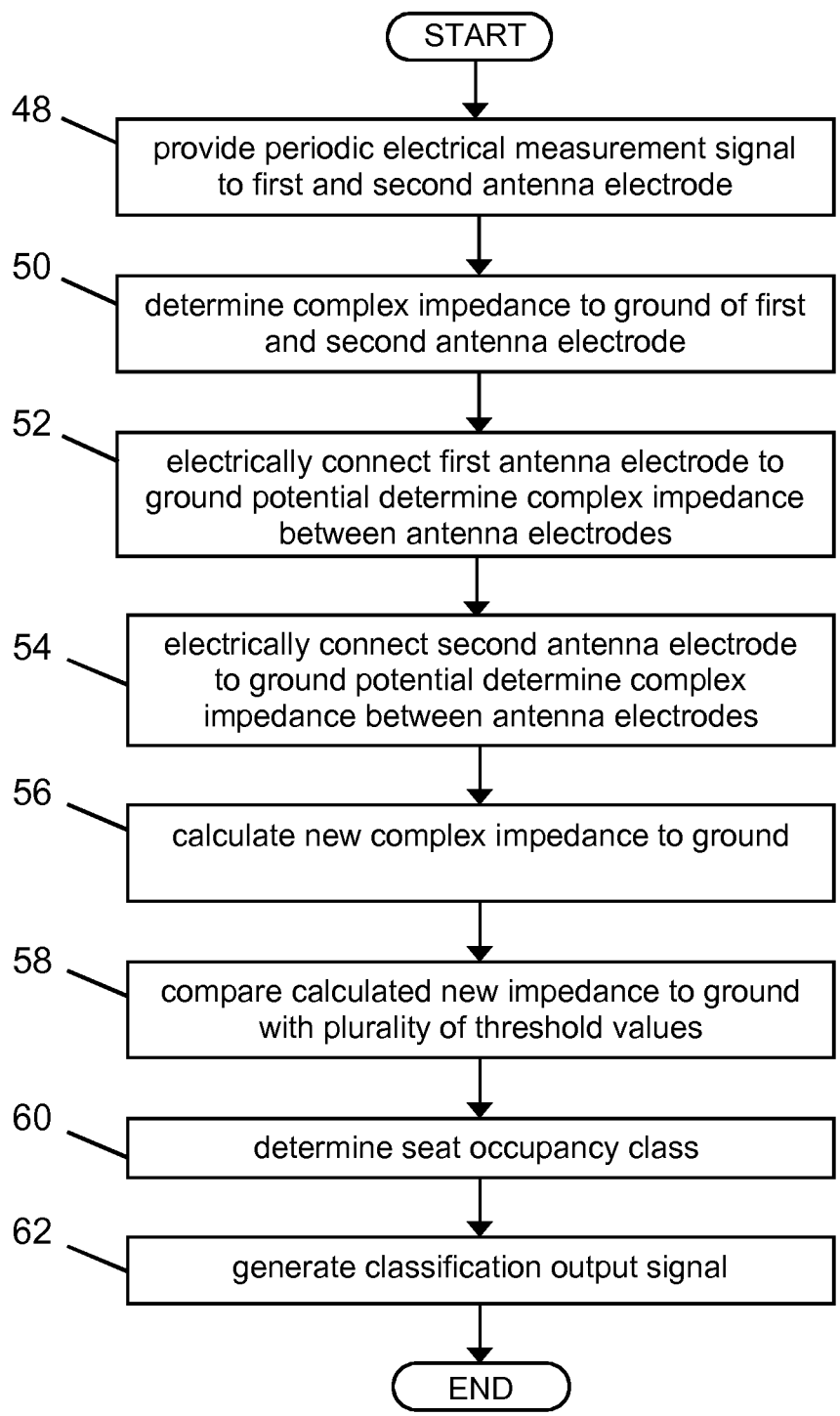
FIG. 8 is a flowchart of an embodiment of a method in accordance with the invention of operating the seat occupancy detection and classification system pursuant to FIG. 1.

With reference to FIG. 8, in a first step 48 of the method, the periodic electrical measurement signal is provided to the first antenna electrode 18 and to the second antenna electrode 20 of the capacitive sensor 16. This configuration is illustrated by the equivalent electrical circuit shown in FIG. 3. Then, a complex impedance to ground of the first antenna electrode from a complex sense current $I_{tx\_S1}$ that is being generated in the first antenna electrode 18 in response to the provided periodic electrical measurement signal and a complex impedance to ground of the second antenna electrode 20 from a complex sense current $I_{tx\_S2}$ that is being generated in the second antenna electrode 18 are determined in another step 50.

Figure 5:
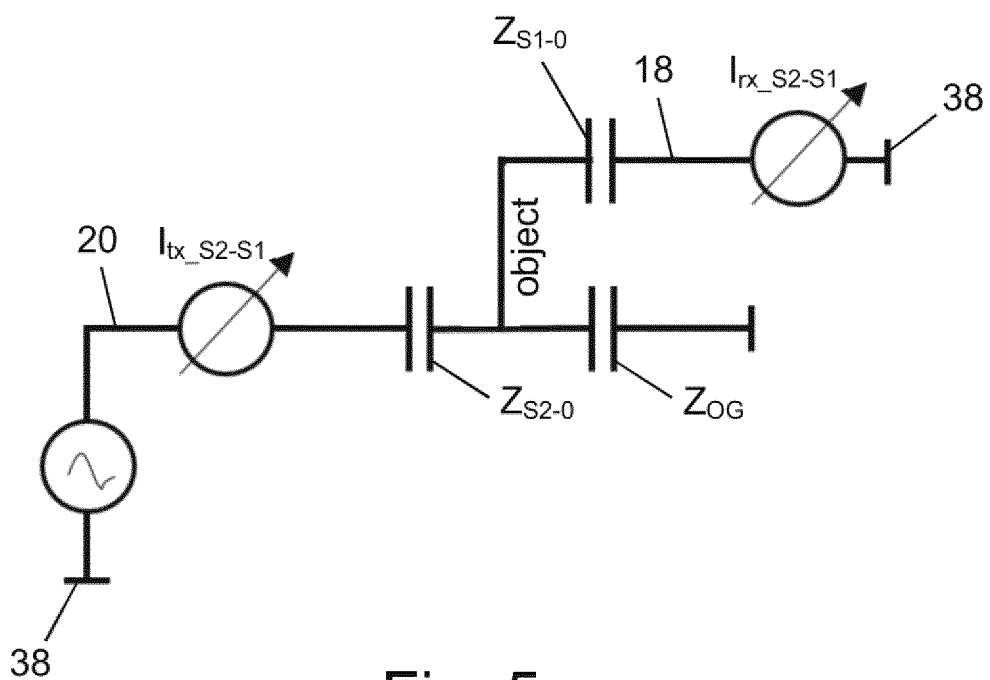
FIG. 5 schematically shows an equivalent electrical circuit of the antenna electrodes and the impedance measurement circuit of the seat occupancy detection and classification system pursuant to FIG. 1 during measurement of impedance between electrodes.
Figure 6:
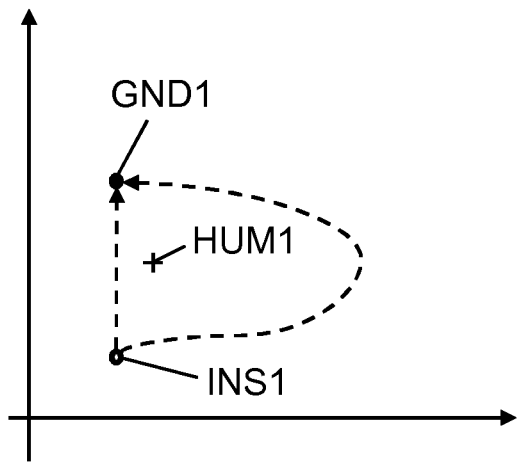
FIG. 6 schematically illustrates possibly measurable impedances to ground for various grounding conditions of a CRS installed in the vehicle seat pursuant to FIG. 1.
Figure 7:
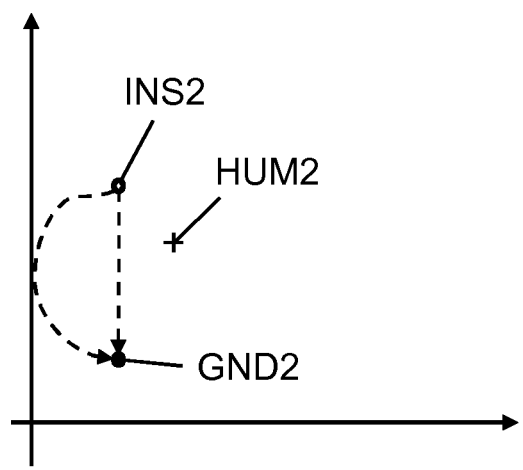
FIG. 7 schematically illustrates possibly measurable impedances between electrodes for various grounding conditions of a CRS installed in the vehicle seat pursuant to FIG. 1.

In a next step 52 of the method, the periodic electrical measurement signal is provided to the second antenna electrode 20, the first antenna electrode 18 is connected to ground potential 38 and the respective sense currents $I_{rxS2-S1}$ and $I_{rxS2-S1}$ are measured. This configuration is illustrated by the equivalent electrical circuit shown in FIG. 5 It will be noted that in FIG. 5, $Z_{S2-O}$ denotes the sensor-to-object impedance with respect to antenna electrode S2, $Z_{S1-O}$ denotes the sensor-to-object impedance with respect to antenna electrode S1 and $Z_{OG}$ the impedance between the object and ground.

In the next step 54 the periodic electrical measurement signal is provided to the first antenna electrode 18, the second antenna electrode 20 is connected to ground potential 38 and the respective sense currents $I_{txS1-S2}$ and $I_{rxS1-S2}$ are measured. This configuration is not illustrated in the figures but the skilled person will note that is analogous to the equivalent electrical circuit shown in FIG. 5.

In the following step 56, a new complex impedance to ground is calculated using determined complex impedances to ground of the first antenna electrode 18 and the second antenna electrode 20, and the determined complex impedances between electrodes.

In one specific embodiment of the method, the step 56 of calculating the new complex impedance to ground includes a calculation according to formula (2):

$$\frac{Z_{OG}}{U} = \frac{(2 \times I_{txS1-S2} - I_{txS1-S2}) \times I_{rxS2-S1} - I_{txS2-S1} \times I_{rxS1-S2}}{(I_{tx\_S1} + I_{tx\_S2}) \times (I_{rxS1-S2} \times I_{rxS2-S1} - I_{txS1-S2} \times I_{txS2-S1})}$$

wherein the previously provided notation holds.

In an alternative embodiment of the method, the step of calculating the new complex impedance can include a calculation according to formula (1):

new complex impedance=determined complex impedance to ground*0.5+determined complex impedance between electrodes, wherein the determined complex impedance to ground is the determined value for either one of the first antenna electrode or the second antenna electrode. It should be noted that the factor of 0.5 is a scaling factor (<1) which is suitably chosen depending on the configuration of the antenna system. In case of symmetrical antenna electrodes, the scaling factor is preferably chosen to be equal or close to 0.5.

Then, the new complex impedance to ground is compared in another step 58 of the method with a plurality of predetermined threshold values, which define distinct regions in the two-dimensional complex number plane. A unique seat occupancy class is assigned to each one of the distinct regions. The seat occupancy classes include "child", "5$^{th}$ percentile female", "50$^{th}$ percentile female", "5$^{th}$ percentile male" and "50$^{th}$ percentile male". The plurality of predetermined threshold values for the complex impedance to ground resides in the digital data memory unit 40 of the control and evaluation unit 26 to which the processor unit 42 has data access.

A seat occupancy class for the calculated new complex impedance to ground is determined in another step 60, depending on a relation between the calculated new complex impedance to ground and the plurality of predetermined threshold values, by assigning the seat occupancy class of the distinct region in which the calculated new complex impedance to ground is enclosed, to the calculated new complex impedance to ground.

In another step 62, the control and evaluation unit 26 generates a classification output signal 28 that is indicative of the determined seat occupancy class. The classification output signal 28 is transferred to the airbag control unit 46 to serve as a basis for a decision to deploy an air bag system to the vehicle seat.

The control and evaluation unit 26 is configured to automatically and periodically carry out the above-described method steps 48-62.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

The invention claimed is:

1. A capacitive sensing device for a seat occupancy detection and classification system, including:
   a capacitive sensor that includes at least a first electrically conductive antenna electrode and at least a second electrically conductive antenna electrode that are mutually galvanically separate from each other;
   an impedance measurement circuit; comprising:
      at least one signal voltage source that is configured for providing, with reference to a ground potential, a periodic electrical measurement signal at an output port, and
      at least one sense current measurement means that is configured to measure complex sense currents with reference to a reference voltage,
   wherein the impedance measurement circuit is configured and electrically connected to said capacitive sensor such that both the first antenna electrode and the second antenna electrode are electrically connectable to the output port for receiving the periodic electrical measurement signal and that at least one of the first and second antenna electrode is alternately electrically connectable to the ground potential, wherein a complex sense current is being generated by the provided periodic electrical measurement signal in each one of the antenna electrodes that is connected to the output port; and
   a signal processing unit that is configured:
      to determine, with reference to the ground potential, a complex impedance of at least one of the two antenna electrodes from a measured complex sense current through the respective antenna electrode with the first antenna electrode being electrically connected to the output port,
      to determine a complex impedance between the two antenna electrodes from individually measured complex sense currents through each of the two antenna electrodes with one of the first and second antenna electrode being electrically connected to the ground potential, and
      to provide output signals that are representative of the determined complex impedances.

2. A seat occupancy detection and classification system, in particular a vehicle seat occupancy detection and classification system, including a capacitive sensing device as claimed in claim 1, wherein the capacitive sensor is electrically connected to the impedance measurement circuit such that an individual complex sense current through any antenna electrode of the two antenna electrodes is measurable by said impedance measurement circuit, and a control and evaluation unit that is configured:
   to receive the output signals provided by the signal processing unit,
   to calculate a new complex impedance with regard to the ground potential using:
      the determined complex impedance with reference to the ground potential of at least one of the two antenna electrodes, and
      the determined complex impedance between the two antenna electrodes,
   to compare the calculated new complex impedance with at least one predetermined threshold value, and,
   based on the result of the comparing, to determine a seat occupancy class.

3. The capacitive seat occupancy detection and classification system as claimed in claim 2, wherein the capacitive sensor is electrically connectable to the impedance measurement circuit such that the first antenna electrode is electrically connectable alternately to the ground potential and to the output port.

4. The capacitive seat occupancy detection and classification system as claimed in claim 2, wherein the capacitive sensing device is configured to periodically change an electrical connection of the first antenna electrode from being electrically connected to the ground potential to being electrically connected to the output port for a predetermined time period and back to being electrically connected to the ground potential after the time period has elapsed.

5. The capacitive seat occupancy detection and classification system as claimed in claim 2, wherein the control and evaluation unit is configured to generate a classification output signal that is indicative of the determined seat occupancy class.

6. A method of operating the capacitive seat occupancy detection and classification system as claimed in claim 2, including steps of:
   providing the periodic electrical measurement signal to at least one of the antenna electrodes by connecting it to the output port,
   determining a complex impedance to ground of at least one of the two antenna electrodes from a complex sense current that is being generated in the respective antenna electrode in response to the provided periodic electrical measurement signal,
   determining a complex impedance between the two antenna electrodes from measured individual complex sense currents through the two antenna electrodes when the first antenna electrode is electrically connected to the ground potential,
   calculating a new complex impedance with regard to the ground potential using:
      one of the at least one determined complex impedances with reference to the ground potential, and
      the determined complex impedance between the two antenna electrodes,
   comparing the new complex impedance with at least one predetermined threshold value, and
   determining a seat occupancy class for the calculated new complex impedance with regard to the ground potential, depending on a relation between the calculated new complex impedance with regard to the ground potential and the at least one predetermined threshold value.

7. The method as claimed in claim 6, further comprising the step of determining an additional complex impedance between the two antenna electrodes from measured individual complex sense currents through the two antenna electrodes when the first antenna electrode is electrically connected to the output port and the second antenna electrode is electrically connected to the ground potential, and wherein the step of calculating a new complex impedance with regard to the ground potential comprises:
using one of the at least one determined complex impedances with reference to the ground potential, and
the determined complex impedance and the additional complex impedance between the two antenna electrodes.

8. The method as claimed in claim 6, wherein the step of calculating the new complex impedance includes a calculation according to:
new complex impedance equals determined complex impedance with reference to the ground potential times scaling factor (<1) plus determined complex impedance between the two antenna electrodes.

9. The method as claimed in claim 7, wherein the step of determining a complex impedance to ground is conducted for both the two antenna electrodes, and the step of calculating the new complex impedance includes a calculation according to:

$$\frac{Z_{OG}}{U} = \frac{(2 \times I_{rxS1-S2} - I_{txS1-S2}) \times I_{rxS2-S1} - I_{txS2-S1} \times I_{rxS1-S2}}{(I_{tx\_S1} + I_{tx\_S2}) \times (I_{rxS1-S2} \times I_{rxS2-S1} - I_{txS1-S2} \times I_{txS2-S1})}$$

wherein the following notation holds:
$I_{tx\_Si}$: the measured complex sense current in the i-th antenna electrode when determining the complex impedance to ground when antenna electrode Si is connected to the output port for receiving the periodic electrical measurement signal,
$I_{txSi-Sj}$: the complex sense current flowing out of the antenna electrode Si when antenna electrode Si is connected to the output port for receiving the periodic electrical measurement signal and electrode Sj is connected to ground, and
$I_{rxSi-Sj}$: the complex sense current flowing into the antenna electrode Sj when antenna electrode Sj is connected to ground and electrode Si is connected to the output port for receiving the periodic electrical measurement signal.

10. A vehicle seat, comprising:
a seat cushion having at least one seat foam member,
a seat base configured for receiving at least a portion of the seat cushion, the seat base and the seat cushion being provided for supporting a bottom of a seat occupant,
a backrest that is provided for supporting a back of the seat occupant, and
a seat occupant detection and classification system as claimed in claim 2, wherein the capacitive sensor is arranged at at least one of the seat cushion and the backrest.

11. The seat as claimed in claim 10, wherein at least one of the first antenna electrode and the second antenna electrode is formed by an electrical seat heater member that is installed in the seat.

12. A non-transitory computer-readable medium for carrying out the method as claimed in claim 7, wherein the method steps to be conducted are stored on the computer-readable medium as a program code wherein the computer-readable medium comprises a part of the capacitive seat occupancy detection and classification system or a separate controller and is executable by a processor of the capacitive seat occupancy detection and classification system or the separate controller.

13. A method of operating a capacitive seat occupancy detection and classification system that includes a control and evaluation unit and a capacitive sensing device as claimed in claim 1, wherein the capacitive sensor is electrically connected to the impedance measurement circuit such that an individual complex sense current through any antenna electrode of the two antenna electrodes is measurable by said impedance measurement circuit, wherein the capacitive sensor is located at a vehicle seat that includes:
a seat structure for erecting the vehicle seat on a passenger cabin floor of the vehicle,
a seat cushion having at least one seat foam member,
a seat base supported by the seat structure and configured for receiving the seat cushion, the seat base and the seat cushion being provided for supporting a bottom of a seat occupant, and
a backrest that is provided for supporting a back of the seat occupant,
wherein the capacitive sensor is arranged at at least one of the seat cushion and the backrest; and
wherein the method comprises carrying out the following steps by the control and evaluation unit:
receiving the output signals provided by the signal processing unit;
calculating a new complex impedance with regard to the ground potential using:
the determined complex impedance with reference to the ground potential of at least one of the two antenna electrodes, and
the determined complex impedance between the two antenna electrodes,
comparing the calculated new complex impedance with at least one predetermined threshold value; and,
based on the result of the comparing, determining a seat occupancy class.

* * * * *